Sept. 30, 1952  W. A. STEINER ET AL  2,612,353
AUTOMATIC BEVERAGE MIXER
Filed Oct. 23, 1948  2 SHEETS—SHEET 1

INVENTORS
WILFRED A. STEINER
BY RICHARD W. SPRUNG
*Hawks & Hardesty*
ATTORNEYS

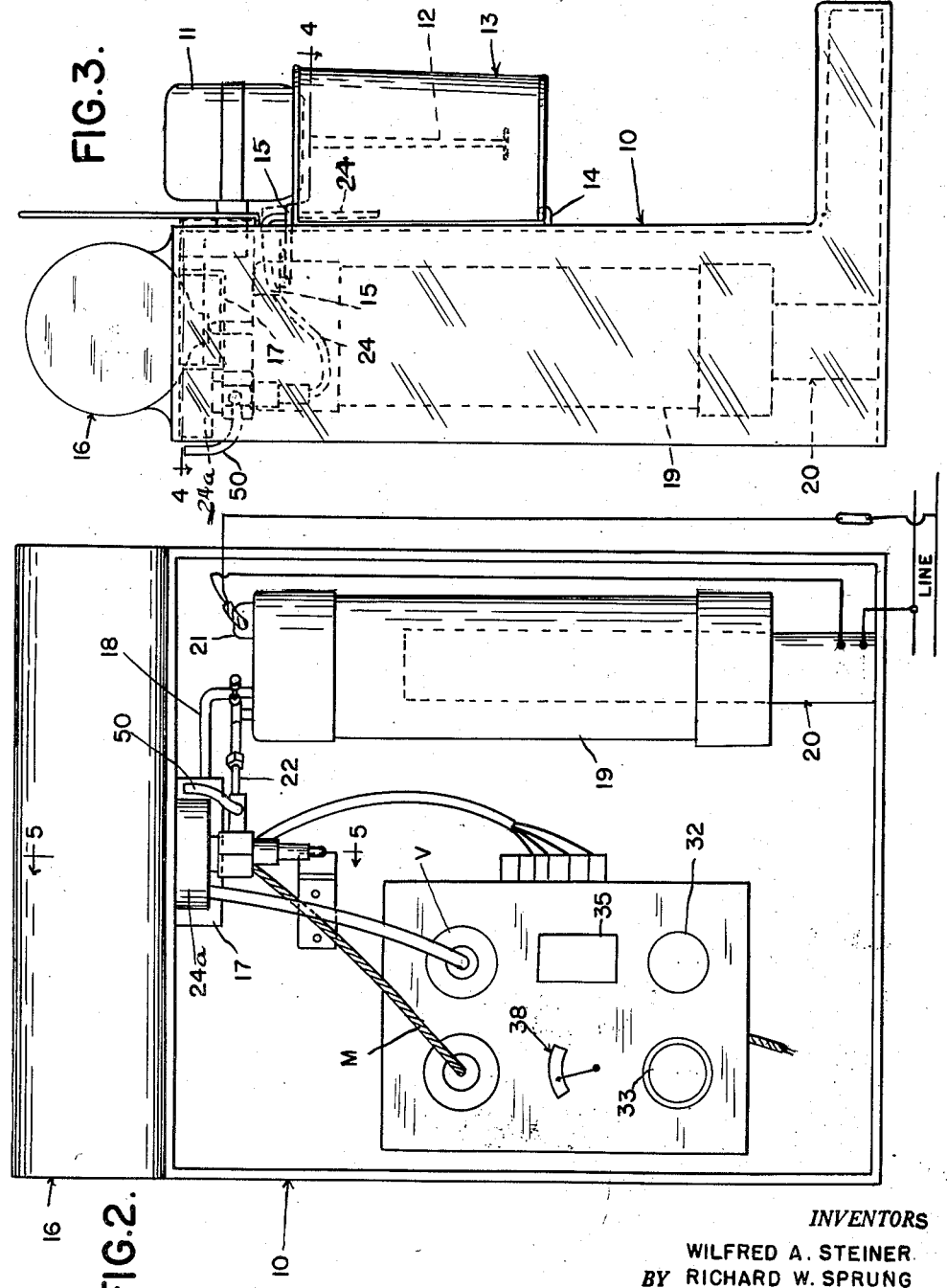

Patented Sept. 30, 1952

2,612,353

UNITED STATES PATENT OFFICE 2,612,353

AUTOMATIC BEVERAGE MIXER

Wilfred A. Steiner and Richard W. Sprung, Detroit, Mich., assignors to Steiner Machine Products Company, Detroit, Mich., a partnership Application October 23, 1948, Serial No. 56,116

4 Claims. (Cl. 259—24)

This invention relates to a mixer and to a timer mechanism therefor suitable to control the quantity of an ingredient to be discharged into a container and which is to be mixed with one or more other ingredients to produce the final product.

In mixers, especially such as beverage mixers, it has always been difficult to exactly measure out proper quantities of some of the ingredients which go to form the final product, and in some types of products, the quality may be made much below standard by slight variations in the quantity of some of the ingredients which are to be mixed together. With a hot chocolate beverage, for instance, a certain quantity of chocolate powder is to be mixed with a very definite quantity of milk or water, and if these proportions are not kept right, the drink is quite unsatisfactory.

It is an object of the present invention to overcome the aforesaid difficulties in connection with mixing ingredients such as soup, hot chocolate, coffee and the like, by providing a mixing machine which incorporates a timer apparatus which repeatedly accurately controls the quantity of certain ingredients automatically discharged into a mixing container from which the final product is dispensed.

More particularly it is an object of the invention to construct a timer apparatus for a machine which mixes ingredients by providing an electrically operated control means for precisely metering or measuring an ingredient which is to be used in the final product which is to be dispensed.

Another object of the invention is to construct an improved mixing machine or apparatus by providing a machine which embodies means for heating a liquid and dispensing measured amounts of such heated liquid to a container in which the heated liquid may be mixed with one or more other ingredients before being dispensed.

Other objects of the present invention have to do with constructing an improved and novel mixing machine by providing a mechanism embodying cooperating and related elements all of which are operable to dispense drinks, soups or other food products of uniformly high quality by incorporating in such mechanism novel instrumentalities that function to precisely proportion the various ingredients which form said food product.

And still another object of the invention is to construct an improved and novel timer mechanism suitable for controlling the operation of a machine or other mechanism by providing a simple and compact electrically actuated instrumentality operable to precisely time certain machine operations.

For a more detailed understanding of the present invention, reference may be had to the accompanying drawings, illustrating a preferred embodiment of the invention in which like parts are referred to by like characters throughout the several views, and in which Fig. 1 is a perspective view of the improved beverage mixer.

Fig. 2 is a rear elevational view thereof, with the back plate removed to show the operating mechanism.

Fig. 3 is a side view thereof.

Figure 6:
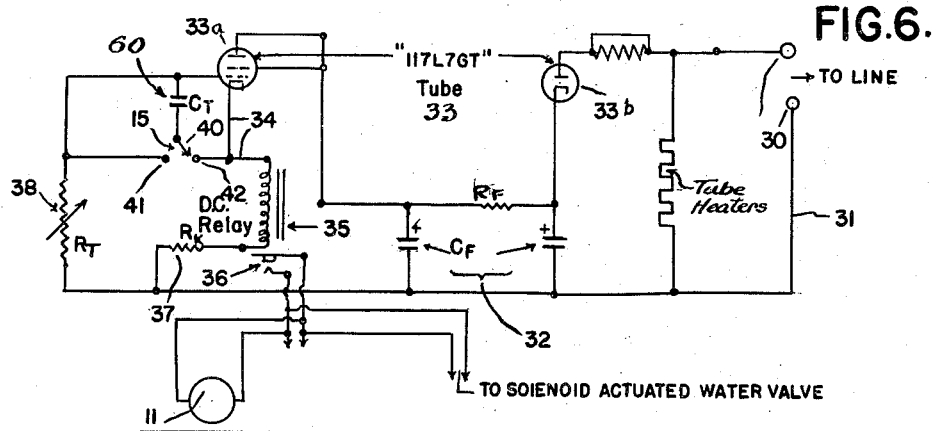
Fig. 6 is a diagrammatic electric circuit diagram of the timer apparatus.

The present invention is illustrated in connection with a beverage mixer, but it will be apparent that the invention is applicable to other types of apparatus, as well. More specifically, the application to which the present invention was primarily directed was a hot soup or beverage mixing and dispensing apparatus, more particularly for mixing and dispensing hot chocolate, hot soups, hot coffee or tea, and the like. This particular construction is suitable however with other types of units in which a measured supply of liquid such as water, milk or other liquids are fed automatically to the container in which said beverage is mixed. The timer apparatus incorporated in the present machine is applicable for use with other types of machines.

Referring more particularly to the accompanying drawings, 10 represents a support or cabinet constructed to house the mechanism, and which also serves as a support on which an electric motor 11 is mounted, said motor driving an agitator 12 constructed to project into a container 13 in which the beverage is mixed.

The cabinet is also provided with a rest or support 14 on which is supported the container 13 when disposed in operating position, and when so disposed, the same is arranged to contact with switch 15 to start the motor in a manner as will hereafter be described.

A storage tank or cistern 16 is supported on the cabinet and this empties into a pan 17 from which a pipe 18 connects this source of liquid supply to an auxiliary tank 19, said auxiliary tank being provided with a conventional heater unit 20 electrically connected by a circuit with a source of electric current (see Fig. 2).

Figure 4:
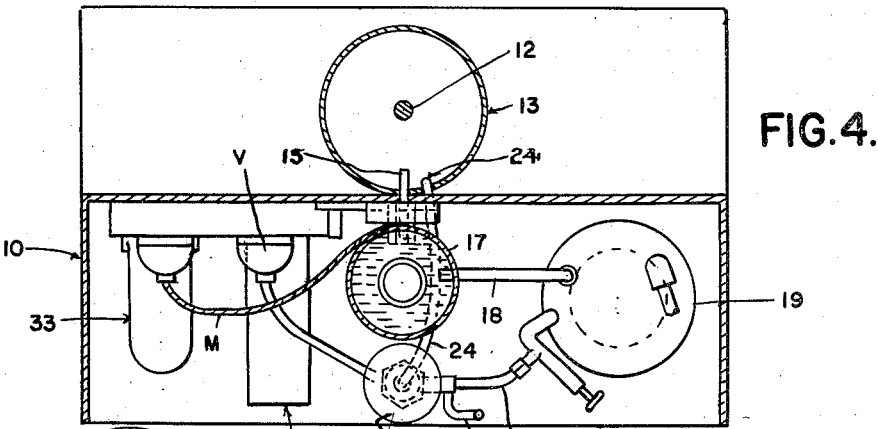
Fig. 4 is a plan horizontal sectional view taken substantially on the line 4—4 of Fig. 3.
Figures 1, 5:
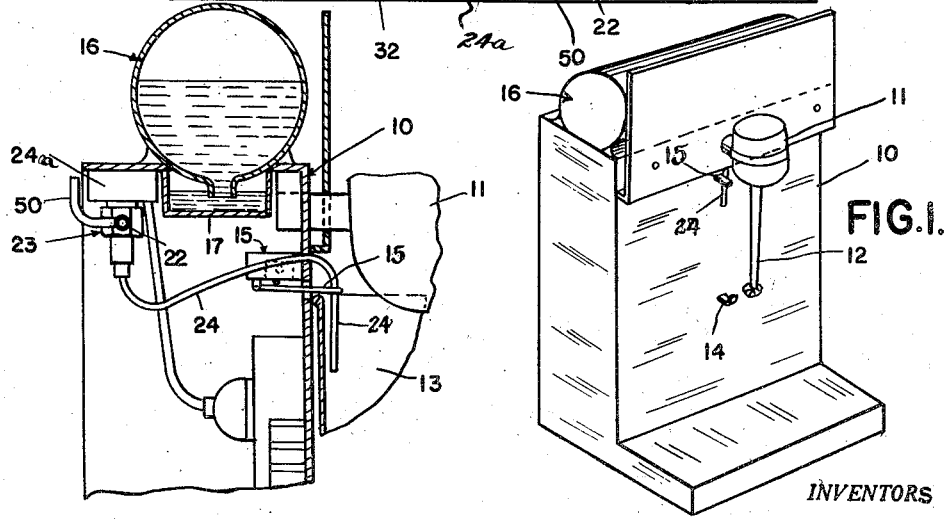
Fig. 5 is a fragmentary sectional view taken substantially on the line 5—5 of Fig. 2.

This tank 19 is preferably provided with a thermostat 21 which controls the ultimate maximum temperature of the liquid in said tank. The supply of liquid to the tank is in a conventional manner as illustrated in detail in Figs. 4 and 5, and thus a constant head is maintained so that there is a substantially constant hydrostatic pressure maintained on the liquid supply in said auxiliary tank.

The liquid is discharged from the tank 19 through the outlet pipe 22 through a valve 23, and thence into the discharge tube 24 which is constructed to discharge the liquid into the container 13. The valve 23 is actuated by a solenoid 24a, and the correct amount of liquid which is to be discharged into the container is obtained by timing the open position of the solenoid actuated valve 23, since this quantity may be accurately measured by timing the duration of discharge, because the liquid is under substantially constant pressure and discharged through a constant orifice. The metering of the liquid and the operation of the mixing and dispensing apparatus is by a novel electric control circuit substantially housed within the cabinet 10. Furthermore, the solenoid actuated valve is normally closed, and can only be actuated to open position by the control hereafter described providing the circuit to the source of electrical current supply is unbroken.

The circuit comprises contacts 30 which connect to a source of electric current such as the ordinary household line or to an ordinary 110 volt A. C. or D. C. circuit. Line 31 leads to the condenser filter 32 which is in series with an all purpose tube such as a 117L7GT tube, designated as a whole by reference numeral 33. One of the plates or grids 33b of the all purpose tube is energized by the electric current to rectify A. C. to D. C. current and the other grid 33a thereof is arranged to receive the D. C. current and charges the condenser 60, which discharges through circuit 34 to a D. C. relay 35 which embodies contacts 36. A suitable resistance 37 is included in the circuit as well as a variable rheostat 38.

The switch 15 comprises a single pole double throw switch and is arranged so that when the container 13 is not in place, the switch arm 40 engages contact 41 and the condenser 60 is charged from said tube. When the container 13 is positioned in place to receive the agitator 12, the rim of the container contacts the switch and closes switch arm 40 with the contact 42, serving to connect the condenser 60 with the relay 35 so that the discharged current from the condenser 60 energizes the relay and closes contact 36, thus turning the motor 11 "on," and also the solenoid 24a is simultaneously energized to open valve 23. The variable rheostat 38 is capable of being adjusted to vary the rate of discharge of the current from the condenser 60 and in the particular construction herein illustrated, it is possible to vary the duration of the discharging of said current from the condenser 60 from about five to fifty seconds.

It is desirable to discharge a measured quantity of liquid into the container 13, which liquid is agitated and mixed with other ingredients which go to comprise the beverage being dispensed. The predetermined amount of liquid being so discharged in the container is thus accurately metered so that upon each operation of the apparatus this measured quantity of liquid is dispensed. Immediately upon discharge of the current from the condenser, the relay then does not receive any current and the contact 36 is opened, thus cutting off the motor 11 and also the current which is conducted to energize the solenoid 24 for opening said valve 23.

On removal of the container from the cabinet the switch 15 is actuated to return arm 40 to make contact with contact 41 to recharge the condenser 60 and same is thus in readiness to repeat the above described sequence of operations when the switch 15 is again actuated to engage the switch arm 40 with contact 42.

Preferably pipe or vent 50 is connected with pipe 22 so as to provide a safety factor on the auxiliary heater tank 19 preventing steam from accumulating when the supply of liquid in the storage tank 16 is used up.

The above described timer apparatus is simple in construction and very accurate in operation and is actuable to accurately control the opening time of valve 23 to a fraction of a second, and thus the discharge of liquid into the container 13 is precisely controlled by timing the duration of discharge of the liquid through the discharge tube 24.

The present apparatus as above illustrated is most particularly applicable for the mixing of hot beverages such as soup, hot chocolate, coffee or tea, although it will be evident that this timing apparatus may be utilized in dispensing other types of food products in which a measured quantity of ingredients are discharged to a dispensing cup or other vessel, or may be employed in the operation of other machines or devices where accurate time controls are required.

It will be apparent that while only one application of the invention has been illustrated and described in detail, that various modifications and changes may be made therein by anyone skilled in the art to which the invention pertains without departing from the spirit of the invention or from the scope of the appended claims.

We claim:

1. A beverage mixer of the character described comprising a support, a motor driven agitator mounted on said support, an electrical circuit and switch in said circuit for said motor, a container demountably mounted on said support and operable to turn said switch "on" when disposed on said support to receive the agitator, a source of liquid supply at substantially constant hydrostatic pressure, an auxiliary liquid reservoir connected with said source of liquid supply and provided with controlled means for heating the liquid in said auxiliary tank and maintaining said liquid at a predetermined high temperature and with liquid discharge means disposed to discharge the liquid into said container, and means operable on actuation of said switch to "on" position to meter the discharge of a predetermined quantity of heated liquid from said auxiliary tank, said liquid metering means comprising a solenoid actuated discharge valve and control means for actuating and maintaining said discharge valve open for a predetermined time interval.

2. A beverage mixer of the character described, and comprising a support, an electric motor mounted on said support, an agitator driven by said motor and adapted for cooperating operation within a container removably mounted on said support, a source of liquid supply at substantially constant hydrostatic pressure and connections including means discharging liquid into said container, valve means controlling the liquid gravity discharge, and electrical control means electrically controlling operation of the motor and valve means to synchronize their operation and time the duration of the opening of said valve to discharge a predetermined quantity of liquid by gravity into said container, said electrical control means operable to simultaneously turn "on" the current to said motor and open said valve and timed to simultaneously cut "off" the current to said motor and close said valve after expiration of a predetermined time interval.

3. In a beverage dispenser, a storage tank for liquid, an auxiliary liquid tank, means connecting said tanks whereby to maintain the liquid in said auxiliary tank at substantially constant pressure, means for heating and maintaining the liquid in said auxiliary tank at a predetermined high temperature, and means discharging a measured quantity of high temperature liquid from said auxiliary tank to a container for mixing same with one or more other ingredients in making a hot beverage, said means comprising a timed electrically operated valve controlling the duration of said liquid discharge, and including an electrical circuit embodying a condenser, a relay and an all purpose tube which receives the current from the source of electrical supply to charge said condenser, said condenser discharging through said relay to energize the relay and thereby open the valve, said relay being actuated to close the valve when the condenser becomes discharged, and a manually adjusted variable rheostat in said circuit to control the rate of discharge of the current from said condenser, a double throw single pole switch in said circuit operable in one position to connect the condenser in circuit to charge same, and in the other position to connect the condenser in circuit to discharge same, and an electric motor driven agitator for agitating the liquid and other ingredients in said container, said switch operable to turn "on" said agitator only when in position for discharging the condenser, said devices operable to turn "off" said agitator in turning "off" the discharge of liquid from said auxiliary tank.

4. A beverage mixer of the character described comprising a support, a motor driven agitator mounted on said support, an electrical circuit and switch in said circuit for said motor, a container demountably mounted on said support and operable to turn said switch "on" when disposed on said support to receive the agitator, a source of liquid supply at substantially constant hydrostatic pressure, an auxiliary liquid reservoir connected with said source of liquid supply and provided with controlled means for heating the liquid in said auxiliary tank and maintaining said liquid at a predetermined high temperature and with liquid discharge means disposed to discharge the liquid into said container, and means operable on actuation of said switch to "on" position to meter the discharge of a predetermined quantity of heated liquid from said auxiliary tank, said liquid discharge means including a discharge valve normally closed and operable to open position only when electrical current is connected with the source of electric current supply.

WILFRED A. STEINER.
RICHARD W. SPRUNG.

REFERENCES CITED

The following references are of record in the file of this patent:

UNITED STATES PATENTS

| Number | Name | Date |
|---|---|---|
| 1,400,553 | Jenks et al. | Dec. 20, 1921 |
| 1,445,112 | Titus et al. | Feb. 13, 1923 |
| 1,521,038 | Moore | Dec. 30, 1924 |
| 1,560,693 | Jenilerzcki | Nov. 10, 1925 |
| 2,144,465 | Selleck | Jan. 17, 1939 |
| 2,279,650 | Wood | Apr. 14, 1942 |
| 2,308,960 | Stevens | Jan. 19, 1943 |
| 2,339,750 | Bartholy | Jan. 25, 1944 |
| 2,347,714 | Sorensen | May 2, 1944 |